United States Patent [19]

Eastridge et al.

[11] Patent Number: 5,241,668
[45] Date of Patent: Aug. 31, 1993

[54] METHOD AND SYSTEM FOR AUTOMATED TERMINATION AND RESUMPTION IN A TIME ZERO BACKUP COPY PROCESS

[75] Inventors: Lawrence E. Eastridge; Robert F. Kern; William F. Micka, all of Tucson, Ariz.; Claus W. Mikkelsen, Morgan Hill, Calif.; James M. Ratliff, Tucson, Ariz.

[73] Assignee: International Business Machines Corporation, Armonk, N.Y.

[21] Appl. No.: 871,363

[22] Filed: Apr. 20, 1992

[51] Int. Cl.⁵ ............................................. G06F 13/20
[52] U.S. Cl. .................................. 395/575; 395/425; 395/600
[58] Field of Search ......................... 395/575, 425, 600; 364/253, 253.1, 282.1, 282.2, 282.3, 282.4

[56] References Cited

U.S. PATENT DOCUMENTS

5,051,887 9/1991 Berger et al. ........................ 364/200

Primary Examiner—Vincent P. Canney
Attorney, Agent, or Firm—Andrew J. Dillon

[57] ABSTRACT

A method in a data processing system for automatically terminating or resuming backup copy sessions after an abnormal interrupt or reset notification occurrence during a backup copy process. A status indication is entered into activity tables associated with a plurality of storage subsystems and devices within a data processing system in response to initiation of a backup copy session. Status indications are then entered upon successful completion of a backup copy session within the data processing system. The indications within the activity tables are reviewed to determine the status of a backup copy session upon restarting a resource manager, abnormal termination of a backup copy program, or an operating system initial program load. If a backup copy session has been initiated but not completed, the backup copy session is then terminated. The indications within the activity tables are also reviewed to determine the status of a backup copy session if a reset notification is raised by a storage subsystem. The tracks extents which are active for a volume associated with a particular session identification are determined. A comparison is then made between the tracks extents which are active and the volume and extent information associated with a physical session identification. If a match exists between the tracks extents which are active and the volume and extent information associated with a physical session identification, the backup copy session resumes. If a match does not exist, the backup copy session is terminated.

23 Claims, 6 Drawing Sheets

METHOD AND SYSTEM FOR AUTOMATED TERMINATION AND RESUMPTION IN A TIME ZERO BACKUP COPY PROCESS

CROSS-REFERENCE TO RELATED APPLICATION

The present application is related to U.S. patent application Ser. No. 07/781,044, entitled Method and Means for Time Zero Backup Copying of Data, filed on Oct. 18, 1991 and assigned to the assignee herein named. The contents of the cross-referenced United States Patent Application is hereby incorporated herein by reference thereto.

BACKGROUND OF THE INVENTION

1. Technical Field

The present invention relates in general to methods and systems for maintaining continued availability of datasets in external storage associated with data processing systems, and in particular to backup copying of records in external storage concurrent with a dramatically shortened suspension of data processing system application execution occasioned by such copying. Still more particularly, the present invention relates to automatic termination or resumption of backup copy sessions in a backup copy process.

2. Description of the Related Art

A modern data processing system must be prepared to recover, not only from corruptions of stored data which occur as a result of noise bursts, software bugs, media defects, and write path errors, but also from global events, such as data processing system power failure. The most common technique of ensuring the continued availability of data within a data processing system is to create one or more copies of selected datasets within a data processing system and store those copies in a nonvolatile environment. This so-called "backup" process occurs within state-of-the-art external storage systems in modern data processing systems.

Backup policies are implemented as a matter of scheduling. Backup policies have a space and time dimension which is exemplified by a range of datasets and by the frequency of backup occurrence. A FULL backup requires the backup of an entire range of a dataset, whether individual portions of that dataset have been updated or not. An INCREMENTAL backup copies only that portion of the dataset which has been updated since a previous backup, either full or incremental. The backup copy thus created represents a consistent view of the data within the dataset as of the time the copy was created.

Of course, those skilled in the art will appreciate that as a result of the process described above, the higher the backup frequency, the more accurately the backup copy will mirror the current state of data within a dataset. In view of the large volumes of data maintained within a typical state-of-the-art data processing system backing up that data is not a trivial operation. Thus, the opportunity cost of backing up data within a dataset may be quite high on a large multiprocessing, multiprogramming facility, relative to other types of processing.

Applications executed within a central processing system are in either a batch (streamed) or interactive (transactional) mode. In a batch mode, usually one application is executed at a time without interruption. Interactive mode is characterized by interrupt driven multiplicity of applications or transactions.

When a data processing system is in the process of backing up data in a batch mode system, each process, task or application within the data processing system is affected. That is, the processes supporting the batch mode operations are suspended for the duration of the copying. Those skilled in the art will recognize that this event is typically referred to as the "backup window." In contrast to batch mode operations, log based or transaction management applications are processed in the interactive mode. Such transaction management applications eliminate the "backup window" by concurrently updating an on-line dataset and logging the change. However, this type of backup copying results in a consistency described as "fuzzy." That is, the backup copy is not a precise "snapshot" of the state of a dataset/database at a single point in time. Rather, a log comprises an event file requiring further processing against the database.

A co-pending U.S. patent application Ser. No. 07/385,647, filed Jul. 25, 1989, entitled A Computer Based Method for Dataset Copying Using An Incremental Backup Policy, illustrates backup in a batch mode system utilizing a modified incremental policy. A modified incremental policy copies only new data or data updates since the last backup. It should be noted that execution of applications within the data processing system are suspended during copying in this system.

As described above, to establish a prior point of consistency in a log based system, it is necessary to "repeat history" by replaying the log from the last check point over the datasets or database of interest. The distinction between batch mode and log based backup is that the backup copy is consistent and speaks as of the time of its last recordation, whereas the log and database mode require further processing in the event of a fault in order to exhibit a point in time consistency.

U.S. Pat. No. 4,507,751, Gawlick et al., entitled Method and Apparatus For Logging Journal Data Using A Write Ahead Dataset, issued Mar. 25, 1985, exemplifies a transaction management system wherein all transactions are recorded on a log on a write-ahead dataset basis. As described within this patent, a unit of work is first recorded on the backup medium (log) and then written to its external storage address.

Co-pending U.S. patent application Ser. No. 07/524,206, filed May 16, 1990, entitled Method and Apparatus for Executing Critical Disk Access Commands, teaches the performance of media maintenance on selected portions of a tracked cyclic operable magnetic media concurrent with active access to other portions of the storage media. The method described therein requires the phased movement of customer data between a target track to an alternate track, diversion of all concurrent access request to the alternate track or tracks and the completion of maintenance and copy back from the alternate to the target track.

Requests and interrupts which occur prior to executing track-to-track customer data movement result in the restarting of the process. Otherwise, request and interrupts occurring during execution of the data movement view a DEVICE BUSY state. This typically causes a re-queuing of the request.

It should therefore be apparent that a need exists for a method and system whereby the maximum availability of application execution within a data processing system is maintained while creating backup copies which exhibit a consistent view of data within an associated database, as of a specific time. Additionally, a need exists for automatically terminating or resuming backup copy sessions upon an abnormal interrupt in the backup copy process.

SUMMARY OF THE INVENTION

It is therefore one object of the present invention to provide an improved method and system for backup copying of records in external storage concurrent with a dramatically shortened suspension of data processing system application execution occasioned by such copying.

It is another object of the present invention to provide a method and system for automatically terminating a backup copy session after an abnormal interrupt in the backup copy process.

It is yet another object of the present invention to provide a method and system for automatically determining the status of a backup copy session and selectively resuming or terminating a backup copy session after a reset notification is generated during the backup copy process.

The foregoing objects are achieved as is now described. A status indication is entered into activity tables associated with a plurality of storage subsystems and devices within a data processing system in response to initiation of a backup copy session. Status indications are then entered upon successful completion of a backup copy session within the data processing system. The indications within the activity tables are reviewed to determine the status of a backup copy session upon restarting a resource manager, abnormal termination of a backup copy program, or an operating system initial program load. If a backup copy session has been initiated but not completed, the backup copy session is then terminated. The indications within the activity tables are also reviewed and checked against a storage subsystem to determine the status of a backup copy session if a reset notification is raised by a storage subsystem. The tracks extents which are active for a volume associated with a particular session identification are determined. A comparison is then made between the tracks extents which are active and the volume and extent information associated with a physical session identification. If a match exists between the tracks extents which are active and the volume and extent information associated with a physical session identification, the backup copy session resumes. If a match does not exist, the backup copy session is terminated.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
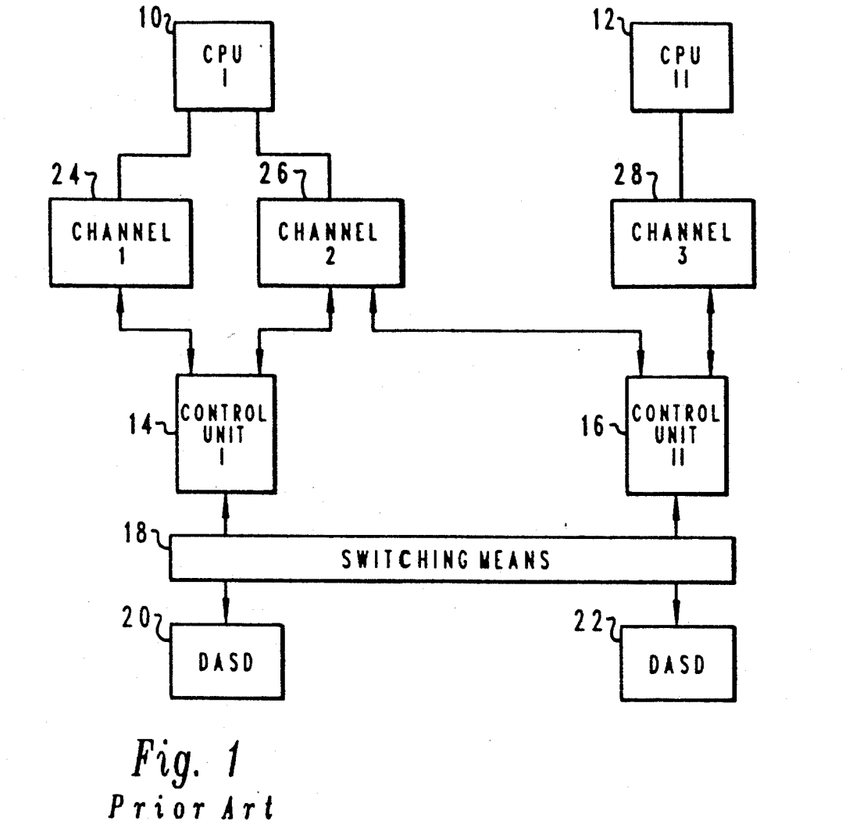
FIG. 1 illustrates a prior art multi-processing multi-programming environment where executing processes and applications randomly or sequentially access data from external storage.

With reference to the figures and in particular with reference to FIG. 1, a prior art multi-processing multi-programming environment is illustrated where executing processes and applications randomly or sequentially access data from external storage. Such systems include a plurality of central processing units 10, 12 which access external storage subsystems 14, 16, 18, 20, 22 over redundant channel demand and response interfaces 24, 26, 28.

The illustrated embodiment in FIG. 1 may be provided in which each processor within the data processing system is implemented utilizing an IBM/360 or 370 architected processor type having, as an example, an IBM MVS operating system. An IBM/360 architected processor is fully described in Amdahl et al., U.S. Pat. No. 3,400,371, entitled Data Processing System, issued on Sep. 3, 1968. A configuration in which multiple processors share access to external storage units is set forth in Luiz et al., U.S. Pat. No. 4,207,609, entitled Path Independent Device Reservation and Reconnection in a Multi-CPU and Shared Device Access System, issued Jan. 10, 1980.

The MVS operating system is also described in IBM Publication GC28-1150, entitled MVS/Extended Architecture System Programming Library: System Macros and Facilities, Vol. 1. Details of standard MVS or other operating system services, such as local lock management, subsystem invocation by interrupt or monitor, and the posting and waiting of tasks is omitted. These operating systems services are believed to be well known to those having skill in this art.

Still referring to FIG. 1, as described in Luiz et al., a processor process may establish a path to externally stored data in an IBM System 370 or similar system through an MVS or other known operating system by invoking a START I/O, transferring control to a channel subsystem which reserves a path to the data over which transfers are made. Typically, executing applications have data dependencies and may briefly suspend operations until a fetch or update has been completed. During such a transfer, the path is locked until the transfer is completed.

Figure 2:
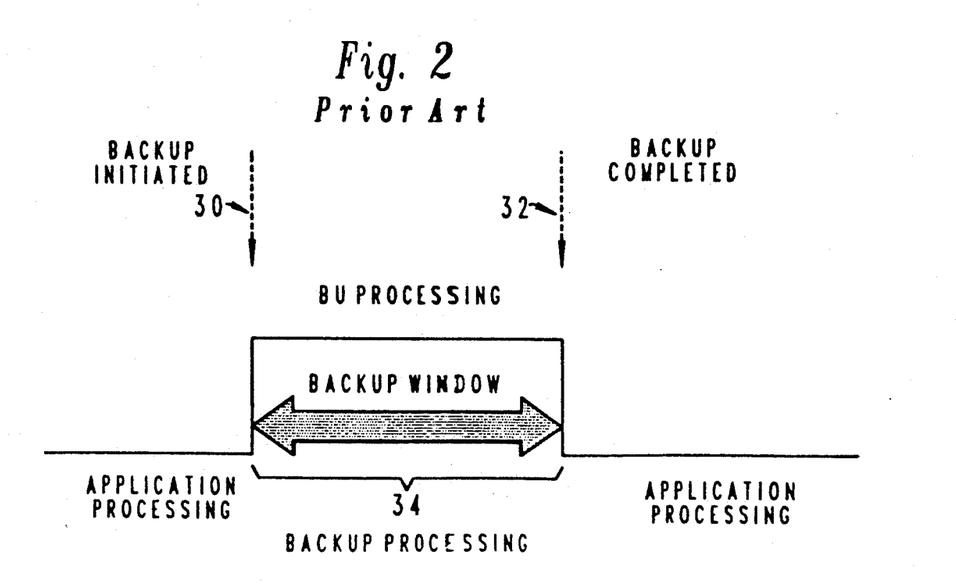
FIG. 2 illustrates a timeline depiction of the backup process according to the prior art.

Referring to FIG. 2, a timeline depiction of the backup process according to the prior art is illustrated. At a first time 30 a backup copy is initiated and applications are suspended or shut down. The suspension continues until the backup copy is completed at a second time 32. Termination of the backup process signifies that all the data specified for backup copy has been read from the source and written to an alternate storage memory. As can be seen, the backup window 34 spans the time from initiation of the backup copy to termination of the backup copy process.

Figure 3:
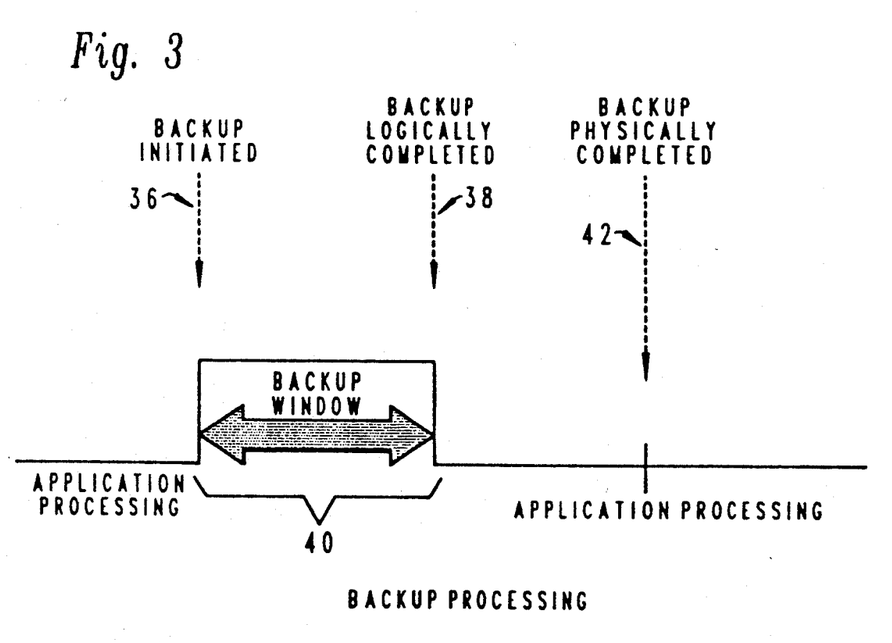
FIG. 3 illustrates a timeline depiction of the backup process according to the present invention.

FIG. 3 illustrates a timeline depiction of the backup process according to the present invention. At a first time 36 the backup copy process is initiated and execution of an application is suspended or shut down. Time 36 is known as "time zero," which means this is the time at which the snapshot of the state of the datasets is taken. As will be described below, the datasets are frozen at that point in time as far as the backup copy process is concerned.

At a second time 38 the backup copy is "logically completed," meaning each track within the datasets to be copied has been identified and mapped in a bitmap, and execution of the application resumes. The datasets can now be used and updated by the application. As can be seen, the backup window 40 is significantly reduced, and is typically measured in milliseconds. Some time later, at a third time 42, the backup copy process is physically completed, meaning all datasets specified for backup copy have been read from the source and written to an alternative storage memory.

Figure 4:
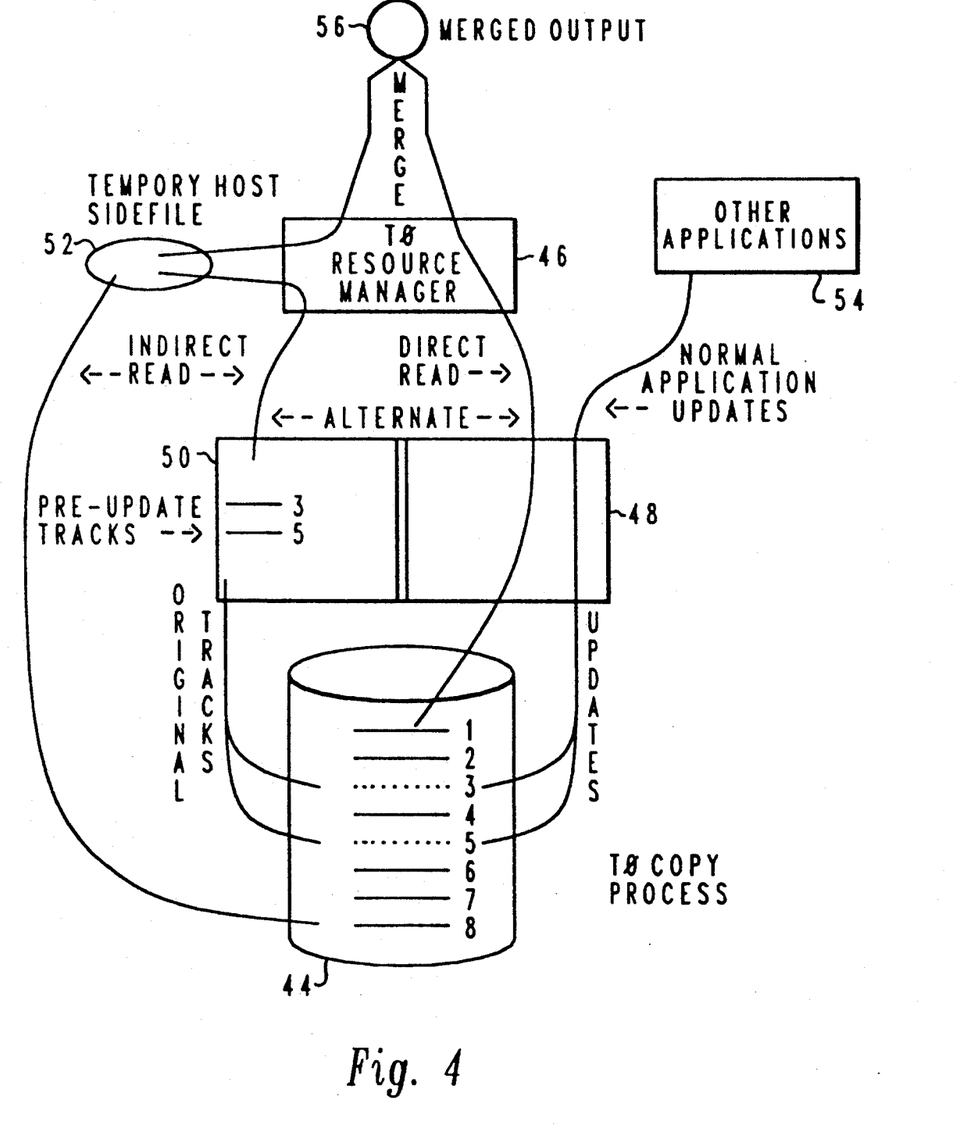
FIG. 4 is a pictorial representation of a method and system for generating a backup copy according to the present invention.

Referring to FIG. 4, there is depicted a conceptual flow of the creation of a time zero backup copy according to the present invention. As illustrated, a time zero backup copy of data within a tracked cyclic storage device 44 may be created. As those skilled in the art will appreciate, data stored within such a device is typically organized into records and datasets. The real address of data within external storage is generally expressed in terms of Direct Access Storage Device (DASD) volumes, cylinders and tracks. The virtual address of such data is generally couched in terms of base addresses and offsets and/or extents from such base addresses.

Further, a record may be of the count-key-data format. A record may occupy one or more units of real storage. A "dataset" is a logical collection of multiple records which may be stored on contiguous units of real storage or which may be dispersed. Therefore, those skilled in the art will appreciate that if backup copies are created at the dataset level it will be necessary to perform multiple sorts to form inverted indices into real storage. For purposes of explanation of this invention, backup processing will be described as managed both at the resource manager level within a data processing system and at the storage subsystem level.

Each processor includes an operating system which includes a T0 resource manager 46. The T0 resource manager 46 is a central resource manager of all T0 copy sessions for the system. Through the T0 resource manager 46 all input/output and session management is coordinated for the processor across all tracked cyclic storage devices 44, storage subsystems 48, storage subsystem memories 50 associated with each storage subsystem 48, and a temporary host memory 52 which may be created within the expanded memory store of a host processor.

As will be described below, the backup copy process includes an initialization period during which datasets are sorted, one or more bit maps are created and logical completion of the bit map is signaled to the invoking process at the processor. The listed or identified datasets are then sorted according to access path elements down to DASD track granularity. Next, bit maps are constructed which correlate the dataset and the access path insofar as any one of them is included or excluded from a given copy session. Lastly, the central processing unit signals logical completion, indicating that updates will be processed against the dataset only after a short delay until such time as physical completion occurs.

Following initialization, each storage subsystem monitors all updates to the dataset. If an update is received from another application 54, storage subsystem 48 will execute a predetermined algorithm to process that update, as described below.

In a time zero backup copy system a determination is first made as to whether or not the update attempted by application 54 is for a volume which is not within the current copy session. If the volume is not within the current copy session, the update completes normally. Alternately, if the update is for a volume which is part of the copy session, the primary session bit map is checked to see if that track is protected. If the corresponding bit within the bit map is off, indicating the track is not currently within a copy session, the update completes normally. However, if the track is protected (the corresponding bit within the bit map is on) the track in question is part of the copy session and has not as yet been read. In such a case, storage subsystem 48 temporarily buffers the update and writes a copy of the affected track from tracked cyclic storage device 44 into a storage subsystem memory 50. Thereafter, the update is permitted to complete.

Thus, as illustrated in FIG. 4, an update initiated by application 54 may be processed through storage subsystem 48 to update data at tracks 3 and 5 within tracked cyclic storage device 44. Prior to permitting the update to occur, tracks 3 and 5 are written to the storage subsystem memory 50 and thereafter, the update is permitted to complete. The primary bit map is then altered to indicate that the copies of tracks 3 and 5, as those tracks existed at the time a backup copy was requested, are no longer within tracked cyclic storage device 44 but now reside within the storage subsystem memory 50.

A merged copy, representing the designated dataset as of the time a backup copy was requested, is then created at reference numeral 56, by copying non-updated tracks directly from tracked cyclic storage device 44, or by indirectly copying those tracks from tracked cyclic storage device 44 to the temporary host memory 52. Additionally, tracks within the dataset which have been written to storage subsystem memory 50 prior to completion of an update may also be indirectly read from the storage subsystem memory 50 to the temporary host memory 52. Those skilled in the art will appreciate that in this manner a copy of a designated dataset may be created from unaltered tracks within tracked cyclic storage device 44, from updated tracks stored within storage subsystem memory 50 and thereafter transferred to temporary host memory 52, wherein these portions of the designated dataset may be merged in backup copy order, utilizing the bit map which was created at the time the backup copy was initiated.

Figure 5:
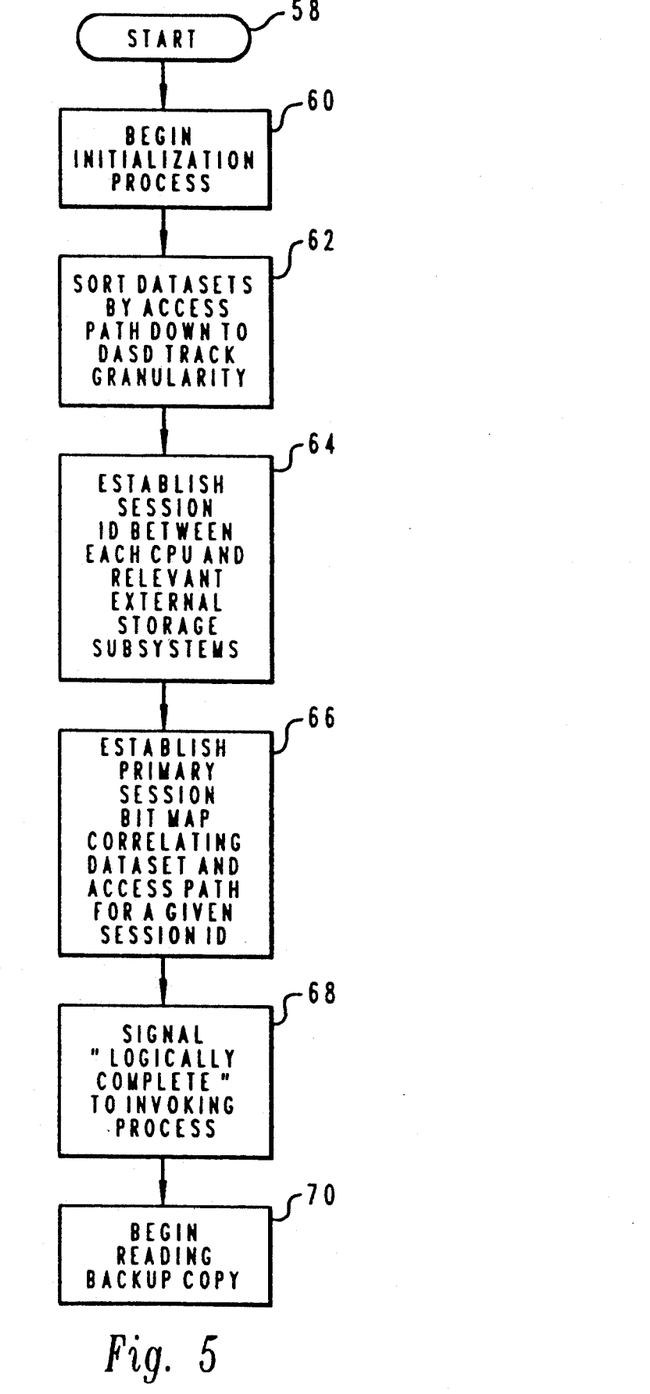
FIG. 5 is a logic flowchart illustrating a method for generating a backup copy at the storage subsystem level according to the present invention.

FIG. 5 is a logic flowchart illustrating the method for generating a backup copy at the storage subsystem level according to the present invention. Referring to FIG. 5, the process starts at block 58 and thereafter passes to block 60 which illustrates the beginning of the initialization process. Thereafter, the process passes to block 62 which depicts the sorting of the datasets by access path, down to DASD track granularity. This sorting process will, necessarily, resolve an identification of the DASD volumes within which the datasets reside and the identification of the storage subsystems to which those volumes belong. It also will resolve the extents of data stored within the external storage.

Next, as depicted at block 64, a session identification is established between each processor and the relevant external storage subsystems. The session identification is preferably unique across all storage subsystems, in order that multiple processors will not interfere with each others' backup copy processes. Thereafter, as illustrated at block 66, a primary session bit map is established which may be utilized, as set forth in detail herein and within the cross-referenced patent application, to indicate whether or not a particular track is part of the present copy session. Thereafter, as depicted at block 68, the "logically complete" signal is sent to the invoking process, indicating that application processing may continue; however, slight delays in updates will occur until such time as the backup copy is physically complete. Block 70 illustrates the beginning of the reading of the backup copy.

Figure 6:
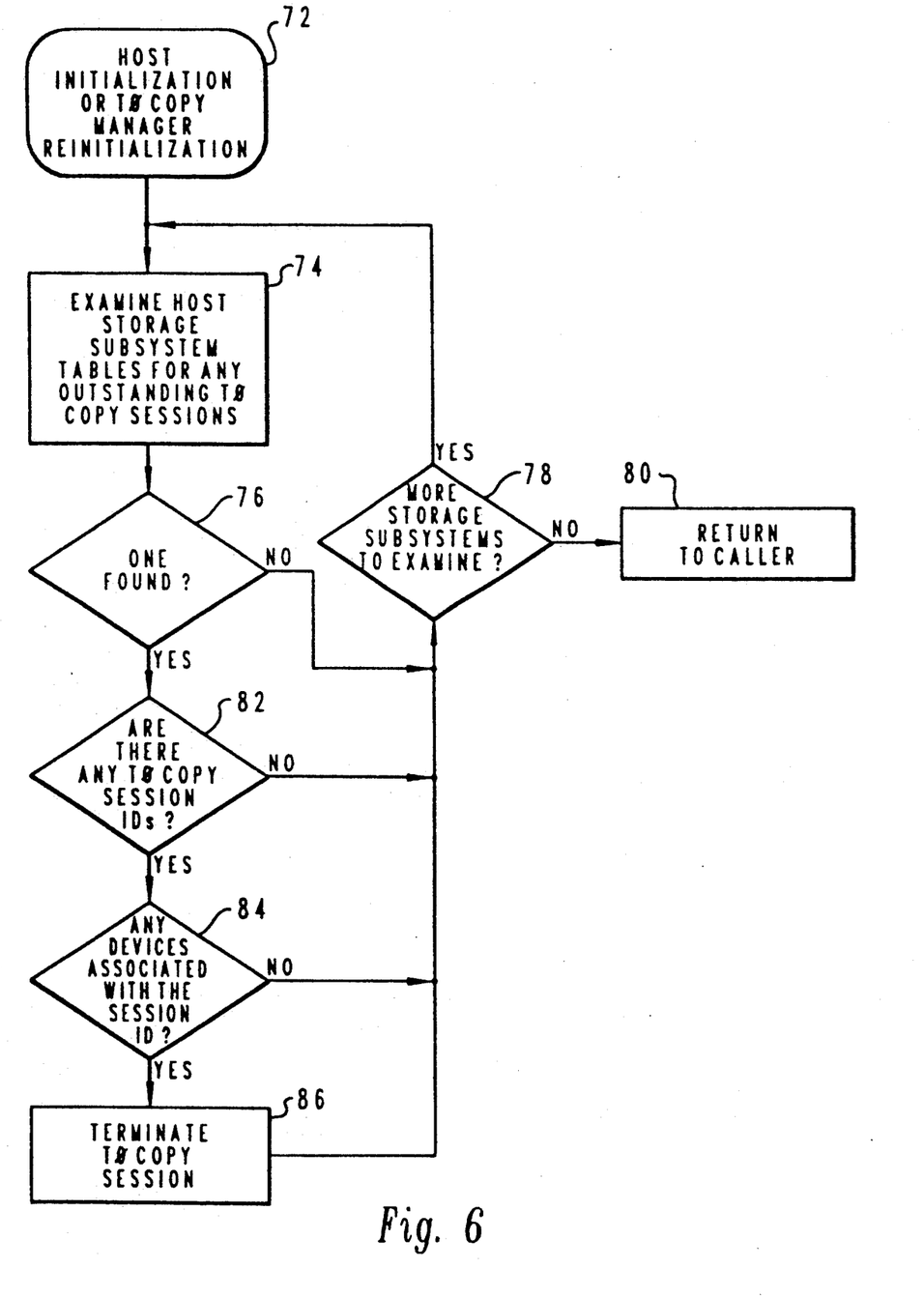
FIG. 6 is a logic flowchart illustrating a method for automatically terminating backup copy sessions according to the present invention.

Referring to FIG. 6, a logic flowchart illustrates a method for automatically terminating backup copy sessions according to the present invention. It is desirable to terminate any outstanding T0 copy sessions upon restarting a T0 resource manager, a host operating system initial program load, or an abnormal termination of a backup copy program. The process begins at block 72, and thereafter passes to block 74. Block 74 depicts the T0 resource manager examining storage subsystem control blocks associated with each storage subsystem and for any device in that storage subsystem. Also, the actual subsystem is queried with an I/O to determine if the subsystem thinks any T0 copy sessions are outstanding. Block 76 depicts a determination of whether or not an outstanding T0 copy session exists in the storage subsystem control blocks for any device in that storage subsystem. Also, the actual subsystem is queried with an I/O to determine if the subsystem thinks any T0 copy sessions are outstanding. If an outstanding T0 copy session does not exist, the process passes to block 78.

Block 78 depicts a determination of whether or not there are more storage subsystems to examine. If there are, the process returns to block 74. If all the storage subsystems have been examined, the process returns to the caller, as depicted in block 80.

Referring again to block 76, if an outstanding T0 copy session exists, the process continues at block 82 which illustrates a determination of whether or not there are any session identifications associated with the outstanding T0 copy session. If a session identification does not exist, the process passes to block 78. If one or more session identifications do exists, block 84 illustrates a determination of whether or not any devices are associated with the session identifications.

If there are no devices associated with each of the session identifications, the process passes to block 78. Finally, if devices are associated with the session identifications, the T0 copy session is terminated with the storage subsystem, as depicted in block 86. The process then passes to block 78.

Figure 7:
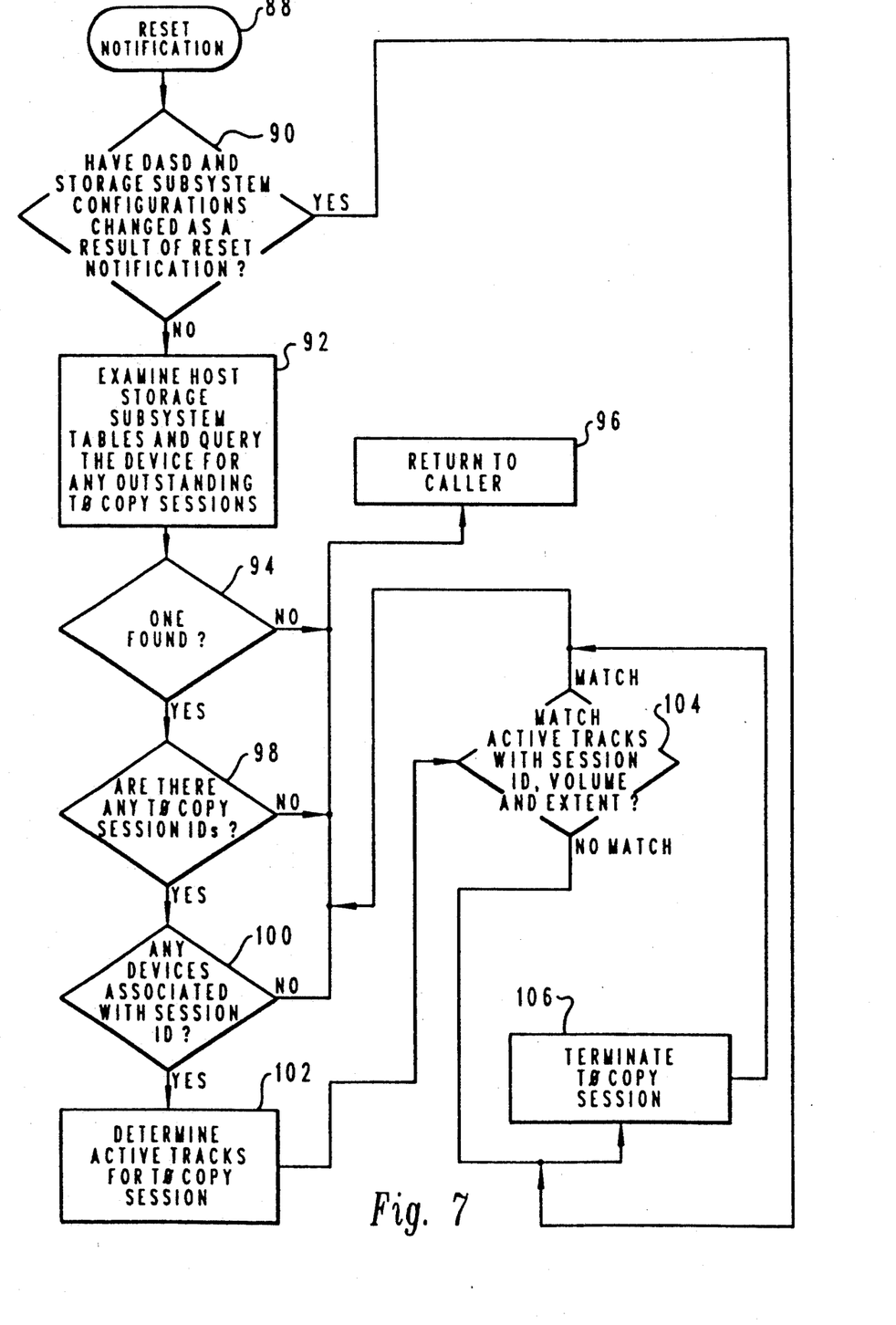
FIG. 7 is a logic flowchart illustrating a method for automatically terminating or resuming backup copy sessions according to the present invention.

FIG. 7 illustrates a logic flowchart depicting a method for automatically terminating or resuming backup copy sessions according to the present invention. Those skilled in the art will recognize that typically a reset notification is sent to a central processing unit from a storage subsystem when either an initial microprogram load occurs, a system reset is sent down all channel paths, or control is lost between a storage subsystem and a central processing unit. Block 88 illustrates the occurrence of a reset notification for a device attached to a storage subsystem that the host recognizes as having the T0 copy capability. Thereafter the process passes to block 90.

Block 90 depicts the T0 resource manager determining whether or not the storage subsystem and DASD configurations have changed as a result of the reset notification. The T0 copy manager also determines if the backup copy sessions match the copy sessions requested by the central processing unit. If the DASD or storage subsystem configurations have changed, or if the backup copy sessions do not match, the process passes to block 106. If the DASD or storage subsystem configurations have not changed and the backup copy sessions match, the process continues at block 92, with the T0 copy manager examining storage subsystem control blocks associated with each storage subsystem and unit control blocks associated with each tracked cyclic storage device for any outstanding T0 copy sessions. The device is also queried with an I/O to determine if it has any outstanding T0 copy sessions. Block 94 depicts a determination of whether or not an outstanding T0 copy session exists in the storage subsystem control blocks for the device on which the reset occurred, or on the device itself. If an outstanding T0 copy session does not exist on the device or in the storage subsystem control blocks, the process passes to block 96.

Referring again to block 94, if an outstanding T0 copy session exists, the process continues at block 98 which illustrates a determination of whether or not there are any session identifications associated with the outstanding T0 copy session. If a session identification does not exist, the process passes to block 96. If one or more session identifications do exists, block 100 illustrates a determination of whether or not any devices are associated with the session identifications.

If there are no devices associated with each of the session identifications, the process passes to block 96. If devices are associated with a session identification, the track extents which are active for that volume for the session identification are determined, as depicted in block 102. A comparison is then made between the track extents which are active and the volume and extent information associated with a physical session identification. This step is depicted in block 104. If a match exists between the track extents which are active and the volume and extent information in a physical session identification, the backup copy session resumes and the process passes to block 96. If a match does not exist, the T0 copy session is terminated, as depicted in block 106. The process then passes to block 96.

While the invention has been particularly shown and described with reference to a preferred embodiment, it will be understood by those skilled in the art that various changes in form and detail may be made therein without departing from the spirit and scope of the invention.

We claim:

1. A method in a data processing system for administering multiple backup copy sessions associated with a backup copy program, wherein said backup copy program suspends execution of applications within said data processing system until each backup copy session is logically complete, and thereafter generates a physically complete backup copy of designated datasets stored in a plurality of storage subsystems during concurrent execution of applications within said data processing system, said method comprising the steps of:
  associating an activity table with each of said plurality of storage subsystems;
  entering a status indication into an activity table associated with a particular storage subsystem in response to an initiation of a backup copy session within said data processing system;
  entering a status indication of successful completion of a backup copy session within said data processing system; and
  periodically reviewing indications within said activity table to determine the status of a backup copy session.

2. The method in a data processing system for administering multiple backup copy sessions associated with a backup copy program according to claim 1, wherein said step of periodically reviewing indications within said activity table to determine the status of a backup copy session comprises periodically reviewing indications within said activity table to determine the status of a backup copy session upon the abnormal termination of said backup copy program.

3. The method in a data processing system for administering multiple backup copy sessions associated with a backup copy program according to claim 2, further comprising the step of terminating a backup copy session which has been initiated but not completed in response to a review of said activity table upon said abnormal termination of said backup copy program.

4. The method in a data processing system for administering multiple backup copy sessions associated with a backup copy program according to claim 1, wherein said backup copy program has a resource manager program associated therewith and wherein said step of periodically reviewing indications within said activity table to determine the status of a backup copy session comprises periodically reviewing indications within said activity table to determine the status of a backup copy session upon the abnormal termination of said resource manager program.

5. The method in a data processing system for administering multiple backup copy sessions associated with a backup copy program according to claim 4, further comprising the step of terminating a backup copy session which has been initiated but not completed in response to a review of said activity table upon said abnormal termination of said resource manager program.

6. The method in a data processing system for administering multiple backup copy sessions associated with a backup copy program according to claim 1, wherein said data processing system has an operating system and wherein said step of periodically reviewing indications within said activity table to determine the status of a backup copy session comprises periodically reviewing indications within said activity table to determine the status of a backup copy session upon said operating system initial program load.

7. The method in a data processing system for administering multiple backup copy sessions associated with a backup copy program according to claim 6, further comprising the step of terminating a backup copy session which has been initiated but not completed in response to said operating system initial program load.

8. The method in a data processing system for administering multiple backup copy sessions associated with a backup copy program according to claim 1, wherein each of said backup copy sessions has a unique session identification associated therewith, and wherein said session identification indicates which of said storage subsystems are utilized in a backup copy session.

9. A method in a data processing system for administering multiple backup copy sessions associated with a backup copy program, wherein said backup copy program suspends execution of applications within said data processing system until each backup copy session is logically complete, and thereafter generates a physically complete backup copy of designated datasets stored in a plurality of storage subsystems during concurrent execution of applications within said data processing system, said method comprising the steps of:
  associating an activity table with each of said plurality of storage subsystems;
  entering a status indication into an activity table associated with a particular storage subsystem in response to an initiation of a backup copy session within said data processing system;
  entering a status indication of successful completion of a backup copy session within said data processing system; and
  reviewing indications within said activity table to determine the status of a backup copy session in response to a reset notification raised by a particular storage subsystem for a device or set of devices.

10. The method in a data processing system for administering multiple backup copy sessions associated with a backup copy program according to claim 9, wherein each of said backup copy sessions has a unique session identification associated therewith, and wherein said method further comprises the step of determining which designated datasets within said plurality of storage subsystems are utilized in a backup copy session and comparing said designated datasets to said session identification associated with said backup copy session.

11. The method in a data processing system for administering multiple backup copy sessions associated with a backup copy program according to claim 10, wherein said session identification associated with a backup copy session indicates which of said storage subsystems are utilized in said backup copy session.

12. The method in a data processing system for administering multiple backup copy sessions associated with a backup copy program according to claim 10, further comprising the step of terminating a backup copy session when said designated datasets do not match the session identification associated with said backup copy session.

13. The method in a data processing system for administering multiple backup copy sessions associated with a backup copy program according to claim 10, further comprising the step of resuming a backup copy session when said designated datasets do match the session identification associated with said backup copy program.

14. A data processing system for administering multiple backup copy sessions associated with a backup copy program, wherein said backup copy program suspends execution of applications within said data processing system until each backup copy session is logically complete, and thereafter generates a physically complete backup copy of designated datasets stored in a plurality of storage subsystems during concurrent execution of applications within said data processing system, said data processing system comprising:
  an activity table associated with each of said plurality of storage subsystems;

means for entering a status indication into an activity table associated with a particular storage subsystem in response to an initiation of a backup copy session within said data processing system;

means for entering a status indication of successful completion of a backup copy session within said data processing system; and means for periodically reviewing indications within said activity table to determine the status of a backup copy session.

15. The data processing system for administering multiple backup copy sessions associated with a backup copy program according to claim 14, further comprising means for terminating a backup copy session which has been initiated but not completed in response to a review of said activity table upon an abnormal termination of said backup copy program.

16. The data processing system for administering multiple backup copy sessions associated with a backup copy program according to claim 14, wherein said backup copy program has a resource manager.

17. The data processing system for administering multiple backup copy sessions associated with a backup copy program according to claim 16, further comprising means for terminating a backup copy session which has been initiated but not completed in response to a review of said activity table upon said abnormal termination of said resource manager program.

18. The data processing system for administering multiple backup copy sessions associated with a backup copy program according to claim 14, wherein said data processing system has an opening system.

19. The data processing system for administering multiple backup copy sessions associated with a backup copy program according to claim 18, further comprising the step of terminating a backup copy session which has been initiated but not completed in response to said operating system initial program load.

20. A data processing system for administering multiple backup copy sessions associated with a backup copy program, wherein said backup copy program suspends execution of applications within said data processing system until each backup copy session is logically complete, and thereafter generates a physically complete backup copy of designated datasets stored in a plurality of storage subsystems during concurrent execution of applications within said data processing system, said data processing system comprising:

an activity table associated with each of said plurality of storage subsystems;

means for entering a status indication into an activity table associated with a particular storage subsystem in response to an initiation of a backup copy session within said data processing system;

means for entering a status indication of successful completion of a backup copy session within said data processing system; and means for reviewing indications within said activity table to determine the status of a backup copy session in response to a reset notification raised by a particular storage subsystem for a device or set of devices.

21. The data processing system for administering multiple backup copy sessions associated with a backup copy program according to claim 20, wherein a session identification associated with a backup copy session indicates which of said storage subsystems are utilized in said backup copy session.

22. The data processing system for administering multiple backup copy sessions associated with a backup copy program according to claim 21, further comprising means for terminating a backup copy session when said designated datasets do not match the session identification associated with said backup copy session.

23. The data processing system for administering multiple backup copy sessions associated with a backup copy program according to claim 21, further comprising means for resuming a backup copy session when said designated datasets do match the session identification associated with said backup copy program.

* * * * *